(12) United States Patent
Clarke et al.

(10) Patent No.: US 7,274,023 B2
(45) Date of Patent: Sep. 25, 2007

(54) GAMMA-RADIATION DETECTOR MODULE FOR PORTAL APPLICATIONS

(75) Inventors: Lucas Lemar Clarke, Uniontown, OH (US); James R. Williams, University Heights, OH (US); Brian Marshall Palmer, Twinsburg, OH (US); Keith D. Jones, Macedonia, OH (US); Nathan Herbert Johnson, Garfield Heights, OH (US); Thomas Robert Anderson, Perry, OH (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 11/247,130

(22) Filed: Oct. 12, 2005

(65) Prior Publication Data

US 2007/0080297 A1   Apr. 12, 2007

(51) Int. Cl.
    *G01T 1/20* (2006.01)
(52) U.S. Cl. .......... 250/366; 250/367; 250/363.01
(58) Field of Classification Search ............ 250/367, 250/366, 363.01
    See application file for complete search history.

(56) References Cited

U.S. PATENT DOCUMENTS

| 3,944,835 | A | 3/1976 | Vosburgh | 250/487 |
|---|---|---|---|---|
| 4,142,102 | A | 2/1979 | Lange | 250/369 |
| 4,171,956 | A | 10/1979 | Uzgiris | 23/230.3 |
| 4,229,654 | A | 10/1980 | Arya et al. | 250/358 |
| 4,245,647 | A | 1/1981 | Randall | 128/659 |
| 4,258,428 | A | 3/1981 | Woronowicz | 364/527 |
| 4,365,339 | A | 12/1982 | Pavkovich et al. | 378/15 |
| 4,525,628 | A | 6/1985 | DiBianca et al. | 250/367 |
| 4,580,055 | A | 4/1986 | Barfod | 250/366 |
| 5,237,179 | A | 8/1993 | Williams et al. | 250/363.02 |
| 5,378,893 | A | 1/1995 | Murray et al. | 250/363.03 |
| 5,504,334 | A | 4/1996 | Jansen et al. | 250/369 |
| 5,543,622 | A | 8/1996 | Stearns | 250/363.03 |
| 5,932,878 | A | 8/1999 | Heukensfeldt et al. | 250/369 |
| 6,362,478 | B1 | 3/2002 | McDaniel et al. | 250/361 |

(Continued)

FOREIGN PATENT DOCUMENTS

WO   WO 03/083512 A2   10/2003

OTHER PUBLICATIONS

Stromswold et al., "Field Tests of a NaI(Tl)-Based Vehicle Portal Monitor at Border Crossings," 2004 IEEE Nuclear Science Symposium Conference Record, Oct. 16-22, 2004, vol. 1, pp. 192-200, vol. XP002423311, Rome, Italy.

Shirakawa, "Responses of Directional Gamma Ray Scintillation Detectors for Searching Radioactive Materials," SICE 2003 Annual Conference Fukui, Japan, Aug. 3-6, 2003, Piscataway, NJ, IEEE vol. 3, Aug. 4, 2003, pp. 2561-2564, XP010716402.

(Continued)

*Primary Examiner*—Constantine Hannaher
(74) *Attorney, Agent, or Firm*—Nixon & Vanderhye, PC

(57) ABSTRACT

The gamma-radiation module includes a housing having a box-like container and a cover for hermetically sealing a pair of cylinders within the housing. Each cylinder includes scintillation material and a photomultiplier tube on a common cylindrical axis. The hermetically sealed module may be used singly or in multiple modules in portal applications whereby gamma-radiation from a source may be detected through a gamma-radiation transparent cover on the module.

15 Claims, 5 Drawing Sheets

U.S. PATENT DOCUMENTS

| | | | |
|---|---|---|---|
| 6,657,199 B2 | 12/2003 | Frederick et al. | 250/361 |
| 6,934,453 B2 | 8/2005 | Desmone | 385/115 |
| 2006/0284094 A1* | 12/2006 | Inbar | 250/359.1 |

OTHER PUBLICATIONS

European Search Report of Application No. EP 06 25 5196 by Examiner K. Eberle at The Hague.

* cited by examiner

GAMMA-RADIATION DETECTOR MODULE FOR PORTAL APPLICATIONS

BACKGROUND OF THE INVENTION

The present invention relates to gamma-radiation detection modules for portal applications and particularly relates to gamma-radiation detection modules for monitoring gamma-radiation emanating from personnel, vehicles, trains, cargo containers and the like.

Existing gamma-radiation detectors used in portal applications are typically either PVT (polyvinyltoluene-based) plastic scintillators or large rectangular NaI(Ti) crystals inside of hermetically sealed housings. In both cases, the detectors utilize photomultiplier tubes to detect photons emitted by the scintillators responsive to impact of gamma-radiation. The PVT-based detectors are used principally because of their relatively low cost. The sodium iodide-based detectors are used primarily for their ability to provide some degree of spectroscopic identification capabilities. Currently, new radiation portals being developed require some degree of spectroscopic identification capability. This means that the use of PVT-based detectors is precluded because the plastic scintillators are unable to provide any energy resolution measurements.

Consequently, sodium iodide-based detectors are preferred since they provide energy resolution measurements. While their costs are higher than PVT-based detectors, the cost of sodium iodide detectors is still lower than many other types of high energy resolution detectors, e.g., high purity germanium, cadmium zinc telluride, high pressure zenon, etc. The drawbacks of sodium iodide-based detectors are that 4-5 detectors must be used to obtain the same detection efficiency as a standard PVT-based portal detector. Additionally, the energy resolution obtainable with these sodium iodide-based detectors is typically 8% at 662 KeV (137-Cs isotope). This means that a tradeoff between energy resolution and cost must be considered when providing a radiation detection portal and the ability to modify or customize detectors for particular portal applications. Accordingly, there has developed a need for a modular, easily manufacturable, high energy resolution gamma detector primarily designed for use in gamma-radiation detection portals.

BRIEF DESCRIPTION OF THE INVENTION

In a preferred embodiment of the present invention, there is provided apparatus for detecting gamma-radiation for portal applications comprising an elongated gamma-radiation detector module having a housing including a cover hermetically sealing the housing; and a pair of cylinders within the housing, each cylinder including elongated scintillation material and a photomultiplier tube arranged along a common axis; the cover having a face overlying at least the scintillation material and formed of a material substantially transparent to gamma-radiation enabling gamma-radiation interaction with the scintillation materials detectable by the photomultiplier tubes to produce an electrical signal proportional to the magnitude of the gamma-radiation.

In another preferred embodiment of the present invention, there is provided a gamma-radiation detector portal comprising a pillar in opposition to a potential gamma-radiation source; a plurality of gamma-radiation detector modules; each detector including a housing having a cover hermetically sealing the housing; a pair of cylinders within the housing, each cylinder including elongated scintillation material and a photomultiplier tube arranged along a common axis; the cover having a face overlying at least the scintillation material and formed of a material substantially transparent to gamma-radiation enabling gamma-radiation interaction with the scintillation materials detectable by the photomultiplier tubes to produce an electrical signal proportional to the magnitude of the gamma-radiation; the modules being stacked on top of one another in the pillar with the faces thereof positioned to receive gamma-radiation from the radiation source.

DETAILED DESCRIPTION OF THE INVENTION

Figure 1:
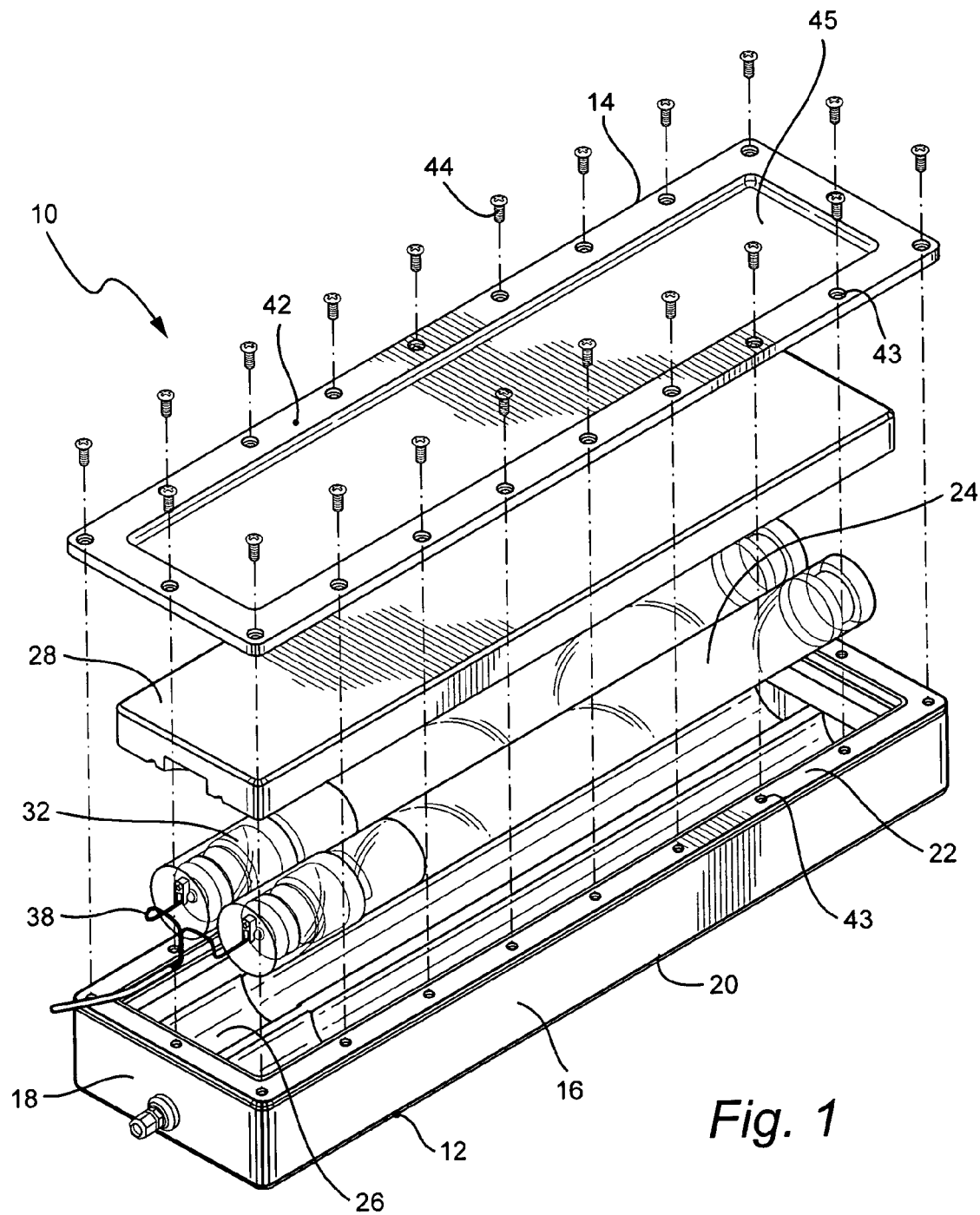
FIG. 1 is an exploded perspective view of a gamma-radiation detector module according to an aspect of the present invention.

Referring now to the drawings, particularly to FIG. 1, there is illustrated a gamma-radiation detection module generally designated 10 for use in detecting gamma-radiation in portal applications. The module 10 includes a box-like container 12 and a cover 14 secured to and hermetically sealing the housing. It will be appreciated that the box-like container 12 has opposed side walls 16, end walls 18 and a bottom wall 20 together with a margin 22 defining an opening within the container 12.

In this preferred embodiment, a pair of cylinders 24 are disposed within the housing. Particularly, the container 12 includes padding 26 preferably shaped to receive the cylinders 24 in side-by-side relation to one another. Padding 28 overlies the cylinders 24 and is similarly shaped to conform, in part, to the cylinders 24. Consequently, the cylinders 24 lie between lower and upper paddings 26 and 28, respectively, all of which in turn lies between the container 12 and cover 14 when the latter is secured to container 12.

Figure 2:
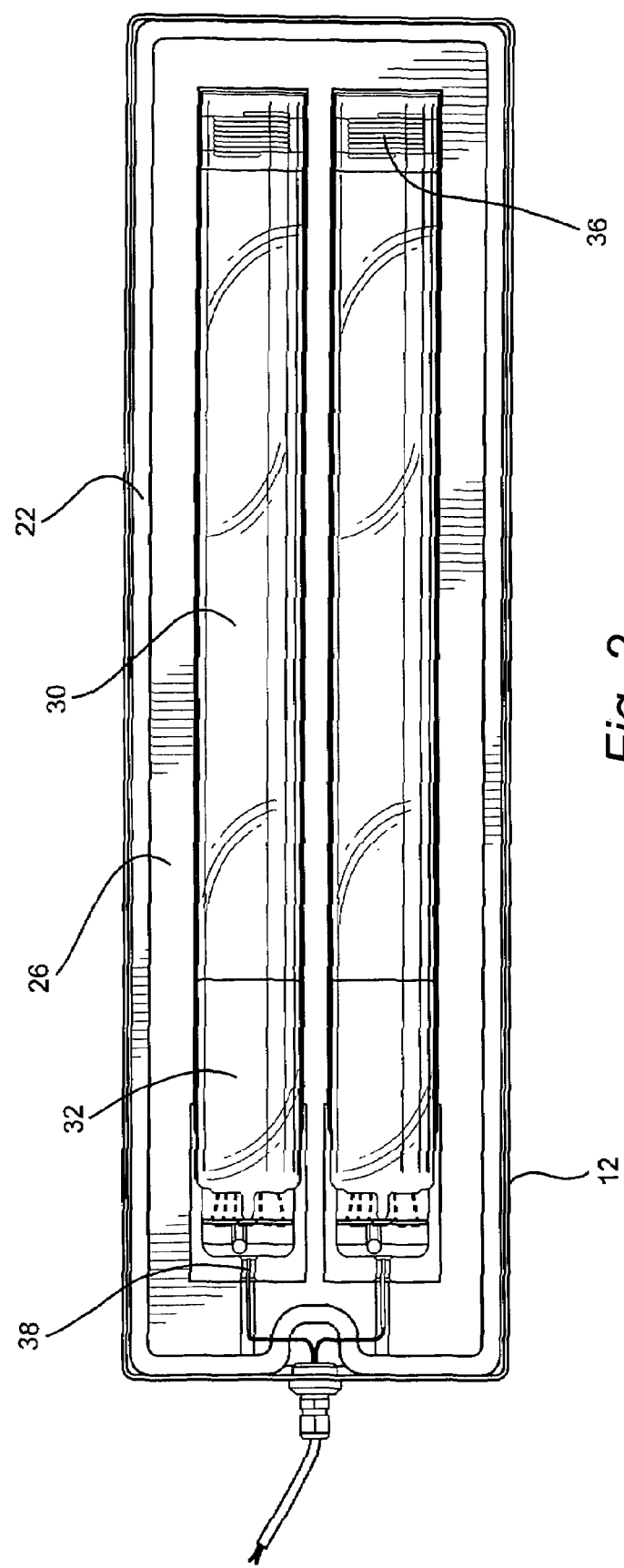
FIG. 2 is a plan view thereof with the cover and certain padding removed to illustrate the disposition of the component parts within the module.
Figure 3:
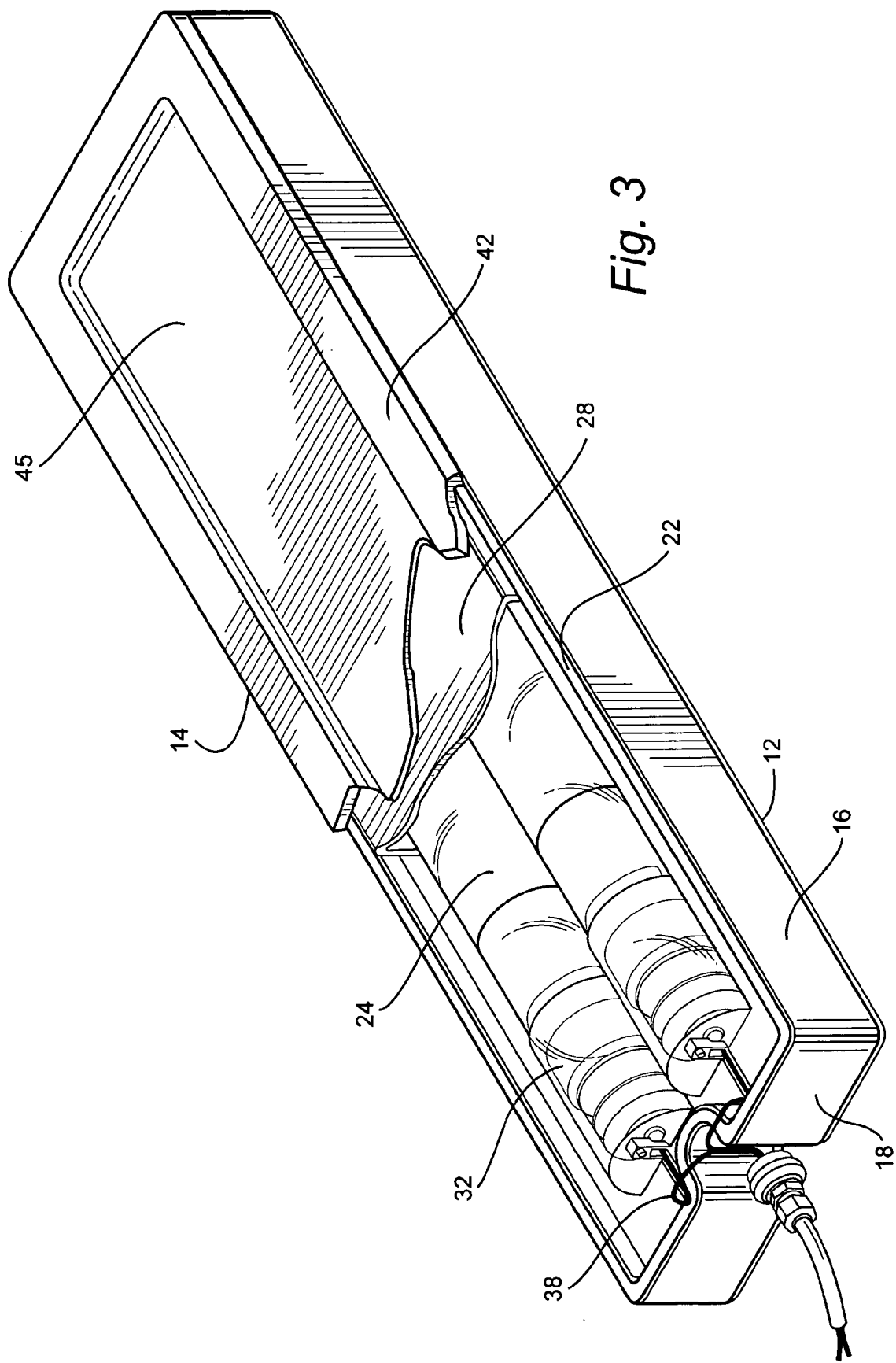
FIG. 3 is a perspective view of the assembled module of FIG. 1 with parts broken away for clarity.

Referring to FIG. 2, each cylinder 24 includes elongated, cylindrically-shaped scintillation material 30, wrapped in a reflective coating, e.g., a tape, and a photomultiplier tube (PMT) 32 arranged along a common axis, i.e., the PMT 32 and scintillation material 30 form continuous parts of the cylinder. Each cylinder also includes a spring 36 at one end of the cylinder for biasing the cylindrical scintillation material 30 against the PMT 32. Each PMT, in turn, includes an electrical outlet connection 38. As illustrated in FIG. 3, the electrical outlet connection 38 for cylinders 24 is connected with the electrical connection for the other cylinder at a location either within the container 12 or externally of the housing to provide an electrical output signal indicative of the magnitude of gamma-radiation detected by the scintillation material 30. The electrical connections 38 may be combined within or outside of the housing as necessary or desirable.

As will be appreciated, the scintillation material interacts with received gamma-radiation to produce photons. The photons are detected by the photomultiplier tubes. The number of photons is a function of the intensity of the gamma-radiation and the PMT tubes convert the impacting photons into an electrical signal proportional to the gamma-radiation impacting the scintillation material. The scintillation material preferably comprises sodium iodide crystals and may comprise any other material which will provide energy resolution capability, such as Thallium doped Cesium Iodide or Bismuth Germanium Oxide.

The container 12 is preferably formed of robust material, such as steel to provide rigidity to the housing. Container 12 may also be lined with a material such as lead to reduce passage of background radiation through the container. The margin 22 of the container 12 may receive a plurality of spaced tapped openings together with a seal 40, e.g., an O-ring seal. The cover 14 similarly has a margin 42 with spaced openings 43 whereby the cover 14 may be secured by screws 44 to the container 12 hermetically sealing the housing about the cylinders 24. It will be appreciated that the hermetic seal is necessary to preclude water vapor or humidity from entering the housing since sodium iodide which forms the preferred scintillation material is hygroscopic and will disintegrate upon contact with water. As illustrated, the margin 42 of the cover 14 is utilized as the structural connection with the container 12. The interior portion of the cover 14 forms a face 45 which is substantially transparent to gamma-radiation, enabling gamma-radiation to pass through the face 44 for interaction with the scintillation material of the cylinders 24. The cover 14 is preferably formed of aluminum. To gain transparency to gamma-radiation, the face 45 is formed to a thickness considerably less than the thickness of the margins 42 of cover 14. For example, the thickness of the face 45 may be on the order of 0.0040 inch and is preferably formed of an aluminum material.

Figure 4:
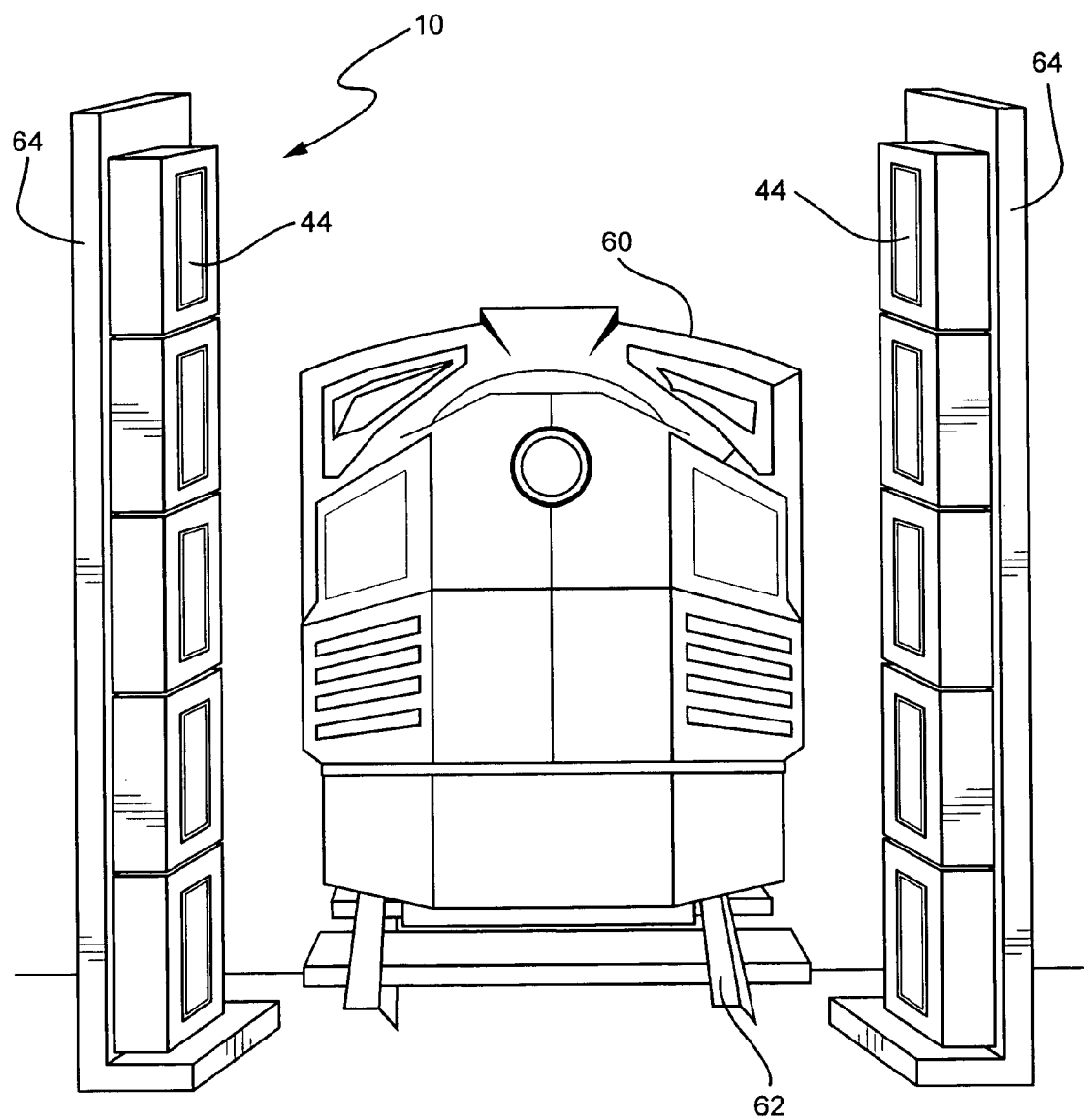
FIG. 4 is a schematic illustration of pillars mounting gamma-radiation modules on opposite sides of a train for detecting gamma-radiation emitted from cars of the train.

As an illustrative example of the dimensional configuration of the housing, the overall length of each cylinder 24 may be on the order of 16 inches having a diameter of 2 inches or slightly in excess of 2 inches. The photomultiplier tubes may be 4 inches in length with a diameter similar to the diameter of the scintillation material. Consequently, the rectilinear configuration of the module may have a length, width and depth on the order of about 22 inches, 6 inches and 4 inches, respectively. It will be appreciated that with this arrangement of cylinders 24 within the housing, the two cylinders are placed side-by-side in the box-like container with a common window for receiving gamma-radiation. The rectilinear configuration of the detection module enables the module for many and varied portal applications. For example, and referring to FIG. 4, there is schematically illustrated a train 60 on rails 62 and wherein it is desirable to detect any gamma-radiation emanating from this source, i.e., the contents of the railroad cars of the train. Because of the rectilinear configuration of the present modules, the modules can be stacked one on top of the other in pillars 64 on one or both sides of the railroad cars as they pass between the pillars 64. For example, five modules 10 may be stacked one on top of the other supported by the pillars 64 with the cylinders 24 of the modules being in a vertical orientation. Consequently, as the rail cars pass by the pillars 64, any gamma-radiation emitted from one or more rail cars will pass through the faces 45 of one or more of the modules 10, enabling the modules to detect the emitted gamma-radiation.

Figure 5:
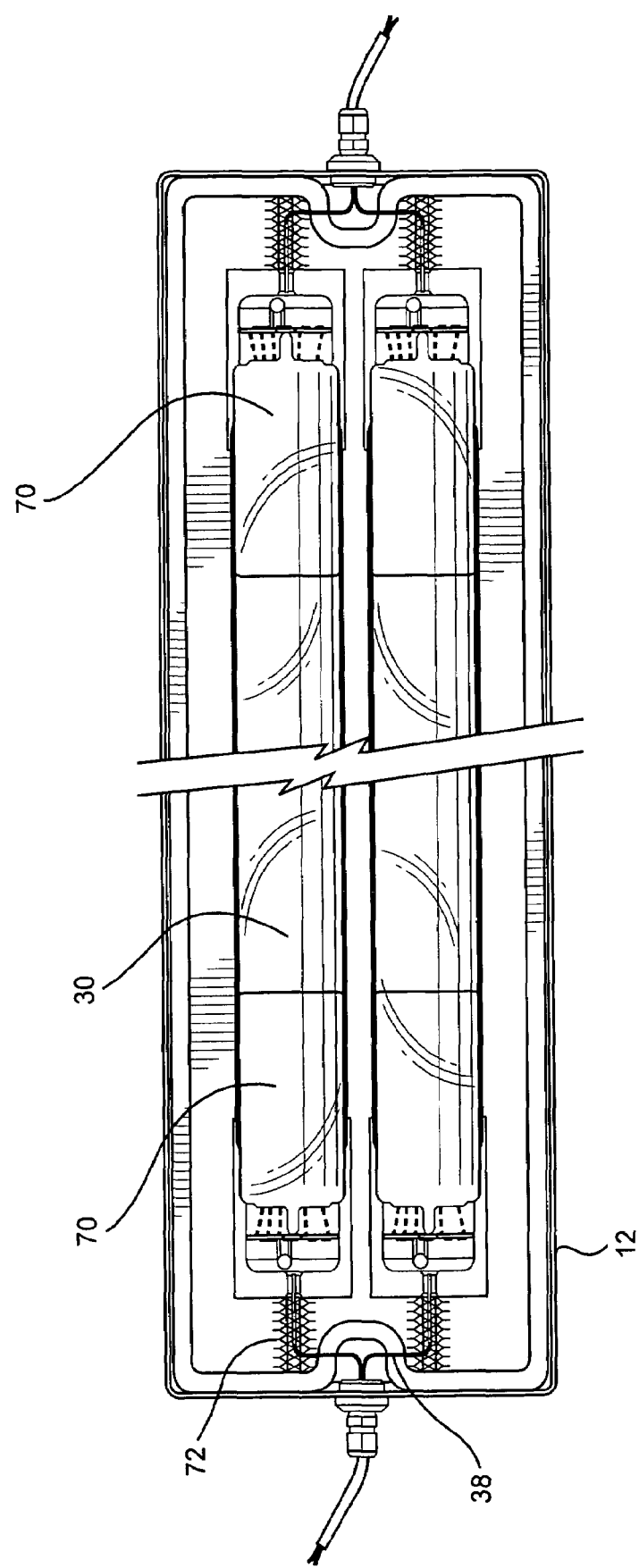
FIG. 5 is a view similar to FIG. 2 illustrating scintillation detectors with PMTs at opposite ends of the scintillation crystal.

Referring to FIG. 5, there is illustrated an alternative construction of the module 10. In this form, the cylinders 24 have photomultiplier tubes 70 at opposite ends of the cylinder, i.e., on opposite axial sides of the scintillation material 30 in the central region of the cylinder. Cylindrical wave springs 72 are provided at opposite ends between the container and the PMTs to bias the latter toward the scintillation material. This hodoscope type of arrangement enables a comparison of the signal's output from the photomultipliers at opposite ends of the cylinders. Thus, spurious signals such as signals received at one end of the cylinder and not at the other end can be disregarded and a more accurate indication of the intensity of the gamma-radiation can be obtained.

It will be appreciated from the foregoing description that the gamma-radiation detection module is easily manufacturable, and affords a high energy resolution detector arranged in a geometry for more simple material processing as well as for improved light collection. With improved light collection, improved energy resolution is also provided by the detectors. For example, energy resolutions of 6.5% to 7.5% full width half-max at 662 KeV (Cs-137 isotope) may be achieved. Also, the modular concept enables application of the same modules in different types of portals as well as enabling variable electronic processing as desired by the user of the module. It will also be appreciated that the scintillation material is not limited solely to sodium iodide and that other scintillation materials may be incorporated as noted above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for detecting gamma-radiation for portal applications comprising:
an elongated gamma-radiation detector module having a housing including a cover hermetically sealing said housing; and
a pair of cylinders within the housing, each cylinder including elongated scintillation material and a photomultiplier tube arranged along a common axis;
said cover having a face overlying at least the scintillation material and formed of a material substantially transparent to gamma-radiation enabling gamma-radiation interaction with the scintillation materials detectable by the photomultiplier tubes to produce an electrical signal proportional to the magnitude of the gamma-radiation, wherein said housing includes padding surrounding said cylinders within the housing to protect the cylinders.

2. Apparatus according to claim 1 wherein said module is generally rectilinear having side, end, top and bottom walls.

3. Apparatus according to claim 1 wherein said cover includes a margin for securing the cover to margins of a box-like container forming part of said housing, said face lying within said cover margin and formed of a material having a depth less than the depth of the cover margin.

4. Apparatus according to claim 1 wherein each said photomultiplier tube has an electrical output signal, said signals being combined within said housing and a single electrical output connection passing through said housing for transmitting the combined signals outside the housing.

5. Apparatus according to claim 1 wherein each said photomultiplier tube has an electrical output signal and an electrical output connection, said connections passing through said housing for transmitting the individual output signals outside of the housing.

6. Apparatus according to claim 1 wherein said module is generally rectilinear and includes a container having side, end, top and bottom walls, said container carrying material for reducing background radiation from passing through the container.

7. Apparatus according to claim 1 wherein each cylinder includes a photomultiplier tube at each of opposite ends thereof on axially opposite sides of the scintillation material.

8. Apparatus according to claim 7 including springs at opposite ends of the cylinders for biasing the photomultiplier tubes in directions toward the scintillation materials.

9. A gamma-radiation detector portal comprising:
 a pillar in opposition to a potential gamma-radiation source;
 a plurality of gamma-radiation detector modules;
 each said detector including a housing having a cover hermetically sealing said housing;
 a pair of cylinders within the housing, each cylinder including elongated scintillation material and a photomultiplier tube arranged along a common axis;
 said cover having a face overlying at least the scintillation material and formed of a material substantially transparent to gamma-radiation enabling gamma-radiation interaction with the scintillation materials detectable by the photomultiplier tubes to produce an electrical signal proportional to the magnitude of the gamma-radiation;
 said modules being stacked on top of one another in said pillar with the faces thereof positioned to receive gamma-radiation from the radiation source
 wherein each said housing includes padding surrounding said cylinders within the housing to protect the cylinders.

10. A portal according to claim 9 wherein each said module is generally rectilinear having side, end, top and bottom walls.

11. A portal according to claim 9 wherein each said cover includes a margin for securing the cover to margins of a box-like container forming part of said housing, each said face lying within said cover margin and formed of a material having a depth less than the depth of the cover margin.

12. A portal according to claim 9 wherein each said module is generally rectilinear and includes a container having side, end, top and bottom walls, each said container carrying material for reducing background radiation from passing through the container.

13. A portal according to claim 9 wherein each cylinder includes a photomultiplier tube at each of opposite ends thereof on axially opposite sides of the scintillation material.

14. Apparatus according to claim 13 including springs at opposite ends of the cylinders for biasing the photomultiplier tubes in directions toward the scintillation materials.

15. Apparatus for detecting gamma-radiation for portal applications comprising:
 an elongated gamma-radiation detector module having a substantially rectangular housing including a cover hermetically sealing said housing, said cover having a face portion substantially transparent to gamma radiation, said housing having a length of about 22 inches, a width of about 6 inches and a depth of about 4 inches; and
 a pair of adjacent and parallel scintillation cylinders arranged within the housing and extending parallel to the length of the housing, each cylinder having an axially adjacent photomultiplier tube arranged along a respective common axis, wherein each cylinder and photomultiplier tube have a combined length of about 20 inches and a diameter of about 2 inches.

* * * * *